United States Patent [19]
Bushman

[11] Patent Number: 5,590,014
[45] Date of Patent: Dec. 31, 1996

[54] METHOD AND APPARATUS FOR SUPPLYING ELECTRIC POWER

[75] Inventor: Boyd B. Bushman, Lewisville, Tex.

[73] Assignee: Lockheed Martin Corporation, Fort Worth, Tex.

[21] Appl. No.: 405,342

[22] Filed: Mar. 16, 1995

[51] Int. Cl.$^6$ ........................................... H01G 7/02
[52] U.S. Cl. ..................... 361/225; 361/233; 307/400
[58] Field of Search ............................ 361/225, 230, 361/233, 235; 307/400; 310/308–310

[56] References Cited

U.S. PATENT DOCUMENTS

| | | | |
|---|---|---|---|
| 3,736,436 | 5/1973 | Crites | 307/400 |
| 3,875,433 | 4/1975 | Uchikawa | 307/400 |
| 4,441,038 | 4/1984 | Tanaka et al. | 307/400 |
| 4,443,711 | 4/1984 | Tanaka et al. | 307/400 |
| 5,179,497 | 1/1993 | Bakhoum . | |

OTHER PUBLICATIONS

Gemant, Andrew, Electrets, Physics Today, pp. 8–13. Mar. 1949.

*Primary Examiner*—Fritz Fleming
*Attorney, Agent, or Firm*—James E. Bradley

[57] ABSTRACT

A method and apparatus are provided for supplying electric power in the form of an output d.c. voltage. An electret material emits the output d.c. voltage in response to continuously applying a high potential static field across the electret material. In a preferred embodiment, a central member is formed from the electret material and includes two spaced apart, oppositely facing contact surfaces. Two voltage input contacts are separately mounted to the two contact surfaces of the central member, each on opposite sides of an outer portion of the electret material. A static voltage source continuously applies a high static voltage potential across the two voltage input contacts to apply the high potential static field across the outer portions of the electret material. Two voltage output contacts are separately mounted to the two contact surfaces of the central member, on opposite sides of an inner portion of the electret material and spaced apart from the two high voltage contacts. In response to the very high potential field being continuously applied across the outer portion of the electret material, the atoms on the molecules of the electret material are electrically aligned to produce a current. The inner portion of the electret material develops an output d.c. voltage across the two voltage output contacts to thereby supply the electric power.

20 Claims, 2 Drawing Sheets

METHOD AND APPARATUS FOR SUPPLYING ELECTRIC POWER

BACKGROUND OF THE INVENTION

1. Field of the Invention

The present invention relates in general to electrical power supplies, and in particular to power supplies for providing a d.c. voltage in response to static electric fields.

2. Description of the Prior Art

Electrets are substances which typically have high dielectric constants. Electrets are herein defined as those materials which, in response to exposure to an electric field, will emit a voltage for extended periods of time after the electric field has been removed. In some cases, these extended periods of time may last as long as several months, or even for several years. Electrets include materials such as wax and barium titanate. A representative list of electret materials is set forth below in Table I, in the section entitled "Detailed Description of the Preferred Embodiment."

Some of the first experiments with electret materials were conducted as early as 1925, using wax as the electret material. Later experiments gradually expanded to titanate series of substances, as reported by Russian investigators in the 1960's. In these experiments, electret materials were exposed to strong electric fields for periods of time. Then, the strong electric fields would be removed and the electrets would continue to emit voltages for long periods of time after the strong electric fields were removed. The emitted voltage potential would quickly deteriorate to very low voltage levels after the strong electric fields were removed. The electret material would often continue to emit these low voltage levels for months, and in some cases, even for years after the strong electric fields were removed. However, the low voltages emitted by the electret materials in these experiments, although present for long periods of time, were too small to provide a useful source of electric power.

Further, static electricity has also long been known in the art. The buildup of static charges have often resulted in static electric fields having very high voltage potentials. These high potential static electric fields have remained largely unusable as a source of electric power, that is, for providing power to operate electric devices.

SUMMARY OF THE INVENTION

A method and apparatus are provided for supplying electric power in the form of an output d.c. voltage. An electret material emits the output d.c. voltage in response to continuously applying a high potential static field across the electret material. In a preferred embodiment, a central member is formed from the electret material and includes two spaced apart, oppositely facing contact surfaces. Two voltage input contacts are separately mounted to the two contact surfaces of the central member, each on opposite sides of an outer portion of the electret material. A static voltage source continuously applies a high static voltage potential across the two voltage input contacts to apply the high potential static field across the outer portions of the electret material. Two voltage output contacts are separately mounted to the two contact surfaces of the central member, on opposite sides of an inner portion of the electret material and spaced apart from the two high voltage contacts. In response to the very high potential field being continuously applied across the outer portion of the electret material, the atoms on the molecules of the electret material are electrically aligned to produce a current. The inner portion of the electret material develops an output d.c. voltage across the two voltage output contacts to thereby supply the electric power.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
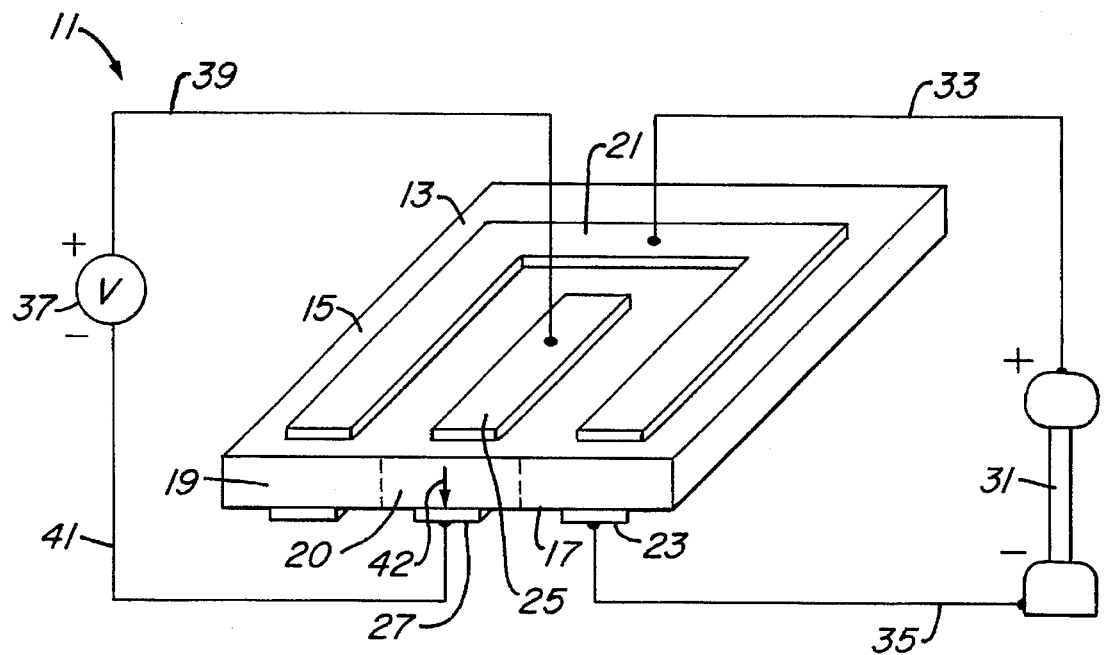
FIG. 1 is a perspective view of a power supply made according to the present invention, which is schematically depicted within an electric circuit.

FIG. 1 schematically depicts power supply 11 of the present invention. Power supply 11 includes central electret member 13, which is formed from wax, an electret material. Electret member 13 preferably consists essentially of the electret material, and is homogeneous. Central member 13 includes two spaced apart, oppositely facing contact surfaces, upper surface 15 and lower surface 17. Central member 13 further includes outer portion 19 and inner portion 20, which are adjacent and extend between upper and lower surface 15, 17. Central member 13 has a length of approximately four (4) inches, a width of approximately two (2) inches and a thickness, which extends between upper and lower surface 15, 17 and measures approximately three-sixteenths ($3/16$) of an inch.

Voltage input contacts 21, 23 are mounted directly to upper surface 15 and lower surface 17, respectively, on opposite sides of outer portion 19. Voltage input contacts 21, 23 together provide a high voltage contact means for applying a high static voltage across outer portion 19 of electret 13. An output voltage means is provided by voltage output contacts 25, 27, which are mounted directly to upper surface 15 and lower surface 17, respectively, on opposite sides of inner portion 20. Voltage output contacts are spaced apart from voltage input contacts 21, 23 respectively, to prevent the high static voltage from arcing from either of voltage input contacts 21, 23 to output voltage contacts 25, 27. Voltage input contacts 21, 23 and voltage output contacts 25 27 are formed from strips of metal aluminum foil. Contacts 21, 23, 25 and 27 are secured to surfaces 15, 17 by conventional means, and provide surface contacts together cover a substantial portion of the surface areas of sides 15, 17 or central member 13.

Van de Graaff generator 31 is connected by means of leads 33, 35 to the high static voltage input contacts 21, 23, respectively. Van de Graaff generator 31 provides a static voltage means which accumulates static electric charges to provide a very high potential static voltage for passing through leads 33, 35 to input voltage contact means 21, 23. The very high voltage provided by Van de Graaff generator 31 is then applied across electret 13 as a high potential static electric field.

An electric load is schematically represented by a voltage meter 37, which is connected by leads 39, 41 to output voltage contacts 25, 27, respectively. Various types of d.c. electric loads may be powered by connecting to the output voltage provided across output voltage contacts 25, 27 according to the present invention.

In operation, Van de Graaff generator 31 provides a very high d.c. voltage potential of 400,000 volts. Leads 33, 35 apply the very high static voltage potential to high voltage contacts 21, 23, which are mounted directly to upper and lower contact surfaces 15, 17 of central electret member 13, respectively. High voltage input contacts 21, 23 apply the very high voltage from Van de Graaff generator 31 across outer portion 19 of electret 13.

In response to the very high d.c. potential applied across outer portion 19, current 42 is created in electret member 13. This provides an output d.c. voltage across inner portion 20 of electret material 13, across upper and lower contact surfaces 15, 17. The output d.c. voltage is applied to voltage output contacts 25, 27. The polarity of the output voltage is aligned across electret member 13 with the polarity of the input high potential d.c. voltage. Leads 39, 41 connect voltage output contacts 25, 27 to voltage meter 37, to apply the output potential across voltage meter 37. Experiments conducted with power supply 11 resulted in output d.c. voltages of approximately 2 volts.

Figure 2:
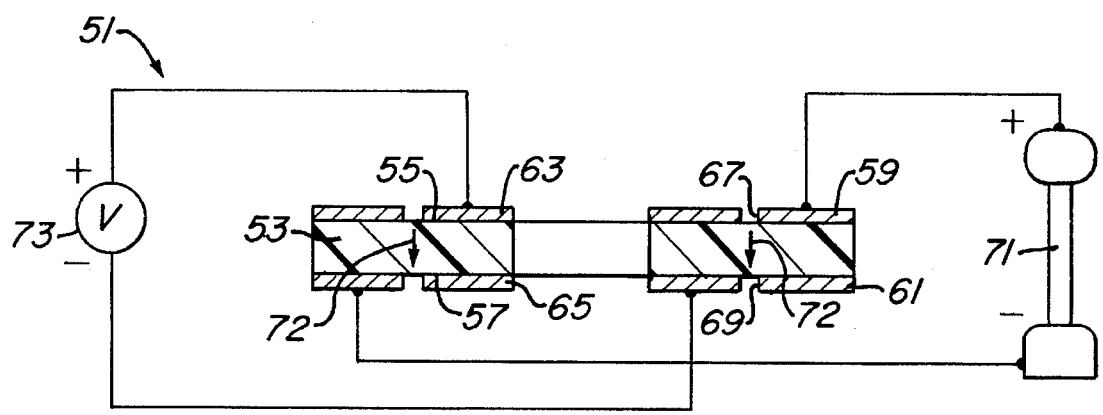
FIG. 2 is a sectional view of an alternative embodiment of a power supply according to the present invention, and is schematically depicted as part of an electric circuit.

FIG. 2 depicts alternative power supply 51 having a central electret member 53 formed in the shape of a disc having a hole in the center. Central member 53 is formed from barium titanate, an electret material. Member 53 preferably consists essentially of the electret material, and is homogeneous. The outer diameter of central member 53 measures approximately two (2) inches. The diameter of the inner hole measures approximately five-eighths (5/8) of an inch, and the thickness measures approximately three-eighths (3/8) of an inch.

Electret 53 has a top contact surface 55 and a bottom contact surface 57. Voltage input contacts 59, 61 are formed by a silver plating deposited on contact surfaces 55, 57, respectively, on opposite sides of outer portion 62 of electret material 53. Voltage output contacts 63, 65 are also provided by silver plating deposited on top and bottom contact surfaces 55, 57, respectively, on opposite sides of inner portion 64 of electret material 53. Grooves 67 and 69 extend into the silver plating on top contact surface 55 and bottom contact surface 57, respectively, to separate voltage input contacts 59, 61 and voltage output contacts 63, 65. Grooves 67, 69 were cut into the silver plating halfway between the inner and outer diameters of member 53. Contacts 59, 61, 63 and 65 cover substantially all of the surface areas of sides 55, 57. Lead wires are clamped to contact surfaces 55, 57 by means of nonconductive plastic clamps, which are not shown.

A conventional Van de Graaff generator 71 is connected across voltage input contacts 59, 61 to apply 400,000 volts d.c. across outer portion 62 of electret material 53. In response to the high d.c. potential applied across outer portion 62, a current flow 72 is created within electret material 53. Current flow 72 results in a buildup of an output voltage across inner portion 64 of electret material 53 and voltage output contacts 63, 65. Voltage meter 73 is connected across voltage output contacts 63, 65, and schematically represents an electric load being powered by the output voltage emitted across contacts 63, 65. Experiments with power supply 51, utilizing barium titanate for the electret material, produced voltages which ranged from 1–3 volts d.c.

Figure 3:
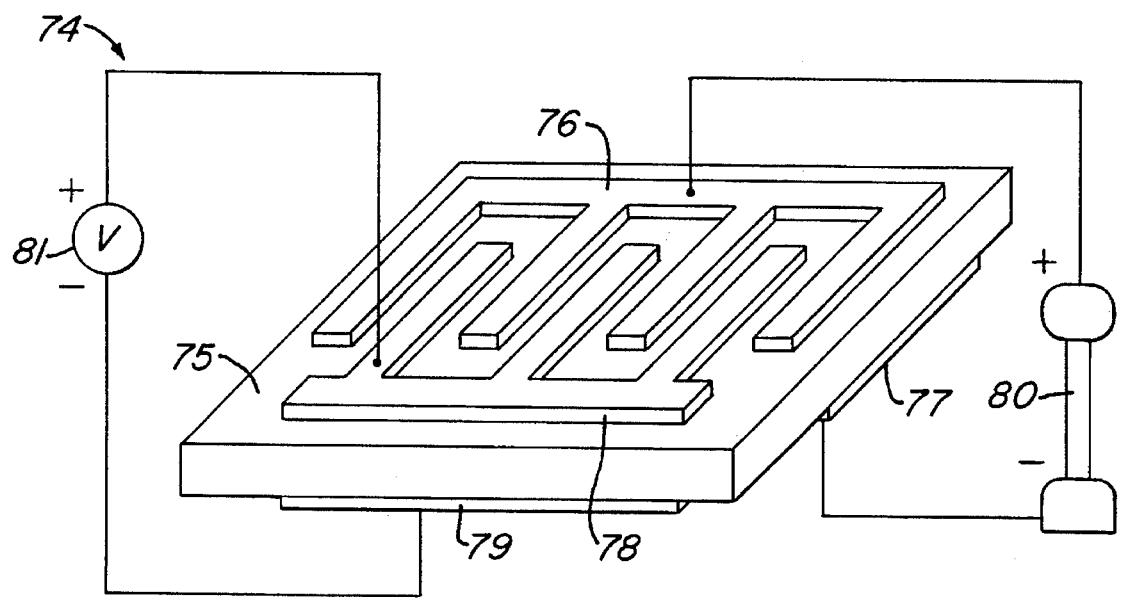
FIG. 3 is a perspective view of an alternative embodiment of a power supply made according to the present invention, which is schematically depicted within an electric circuit.

FIG. 3 is a perspective view of alternative power supply cell 74 made according to the present invention. Cell 74 may be electrically connected in series with other cells to provide higher voltage potentials than can be provided with a single cell. Power supply cell 74 includes central electret member 75, to which voltage input comb contacts 76 and 77 have been mounted on opposite sides. Voltage output comb contacts 78, 79 are also mounted to the opposite sides of central electret member 75, spaced apart from and in an interlacing alignment with voltage input combs 76, 77, respectively. Comb contacts 76, 77 and 78, 79 each provide a plurality of contacts mounted directly to the opposite sides of electret 75. This provides for a larger surface area for contacts 76 through 79, and should provide an electrically parallel arrangement for providing increased amounts of current from central electret member 75.

Output contacts 78, 79 of power cell 74 can be electrically connected in series with the output contacts for other power cells made according to the present invention to provide a power supply or battery which is capable of supplying higher current than cell 74 can alone. Further, output contacts 78, 79 of cell 74 may also be electrically connected in series with cells provided by other central electret members to provide higher voltage potentials than can be provided with a single electret power cell.

Figure 4:
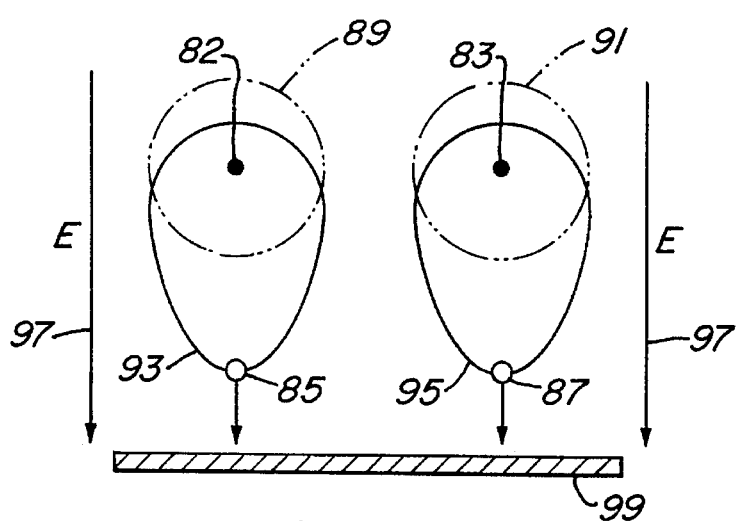
FIG. 4 is a schematic diagram illustrating two molecules of an electret material which are disposed within a strong electric field to generate electric power according to the present invention.

FIG. 4 schematically depicts the electret material of a power supply according to the present invention on a molecular level after applying a high d.c. voltage. Molecules 82, 83 of the electret material have electrons 85, 87 which were travelling along valence paths 89, 91, respectively, prior to applying the high d.c. voltage. These initial valence paths 89, 91 are schematically depicted as generally circular orbits. Application of the high d.c. voltage results in a very high static electric field 97 being applied across the electret material. Electric field 97 pulls electrons 85, 87 toward the positive side of the electric field, toward collector 99. This causes valence electrons 85, 87 to move into elliptical paths 93, 95. Electrons 85, 87 are depicted at the apexes of elliptical orbits 93, 95.

When valence electrons 85, 87 are at the apexes of elliptical paths 93, 95, in the positions shown in FIG. 4, they achieve sufficient energy to break free from molecules 82, 83 and move toward the positive end of electric field 97, to collector 99. Collector 99 is representative a voltage output contact disposed on a contact surface of the electret material. Thus, the very high potential of accumulated static electric charges provides a static electric field 97 which is applied across the electret material and induces power excitation by causing valence electrons 85, 87 to break free from electret molecules 82, 83 at the apexes of elliptical orbits 93, 95.

Various other electret materials may be used in power supplies of alternative embodiments of the present invention. Table I, which follows, is a representative list of some of various electret materials which may be utilized for providing power supplies according to the present invention.

Table 1

Barium Oxide Titanium Dioxide Complex (BaO.4TiO2)
Barium Titanate (BaTiO3)

Borosilicate Glass
Calcium Sulfide activated with Copper and Chlorine
Calcium titanate (CaTiO3)
Ceramics
Dielectrics
Ebonite
Esters
Potassium Bromide (KBr)
Lucite
Magnesium Titanate (MgTiO3)
Naphthalene
Nylon
Paraffin and Carbon Black
Paraffins
Piezoelectric Materials
Plexiglass
Polymer
Polymethylmethacrylate
polymethylmethacrylate and Polystyrene PVC
Ployvinylchloride
Resin and Paraffin treated Paper
Rosin
Rosin-wax
Rhombie Sulfur
Strontium Titanate (SrTiO3)
Strontium-barium Titanate
Sulfur
Titanate Ceramic Electrets
Wax
Zinc Sulfide (ZnS) activated with Copper (Cu) and Chlorene (Cl)
Zinc Titanate (ZnTiO3)

The present invention provides significant advantages over the prior art. Static electric charges are accumulated by a Van de Graaff generator to provide a static electric field of a very high voltage which is applied across an electret material. The static electric field is applied across an outer portion of the electret material, and induces power excitation by freeing outer valence electrons in an inner portion of the electret material. The power excitation provides a d.c. voltage which may be used to power electric devices. A power supply according to the present invention provides output voltages of useful levels in response to a high potential field generated from static electricity.

Although the invention has been described with reference to specific embodiments, this description is not meant to be construed in a limiting sense. Various modifications of the disclosed embodiments as well as other alternative embodiments of the invention will become apparent to persons skilled in the art upon reference to the description of the invention. It is therefore contemplated that the appended claims will cover any such modifications or other embodiments that fall within the true scope of the invention.

I claim:

1. An apparatus for supplying electric power, the apparatus comprising in combination:

a central member of an electret material;

a pair of voltage input contacts electrically connected to and spaced apart on the central member;

static voltage means connected to the voltage input contacts for applying a static voltage potential across the voltage input contacts to create a current flow in the central member; and a pair of voltage output contacts electrically connected to the central member, spaced apart from the voltage input contacts for receiving the current flow while the static voltage potential is being applied to the central member.

2. The apparatus according to claim 1, wherein the central member has two oppositely facing sides, one of the voltage input contacts is electrically connected to one side and the other of the voltage input contacts is electrically connected to the other side, so as to induce current flow in the central member from one side to the other side.

3. The apparatus according to claim 1, wherein the central member has two oppositely facing sides, one of the voltage output contacts is electrically connected to one side and the other of the voltage output contacts is electrically connected to the other side, so as to receive the current flow from the central member.

4. The apparatus according to claim 1, wherein the central member consists essentially of the electret material.

5. The apparatus according to claim 1, wherein the static voltage means comprises a Van de Graaff generator.

6. The apparatus according to claim 1, wherein the voltage input contacts extend at least partially around respective ones of the voltage output contacts.

7. The apparatus according to claim 1, wherein:

the central member has two oppositely facing sides;

one of the voltage output contacts is electrically connected to one side and the other of the voltage output contacts is electrically connected to the other side, so as to receive the current flow from the central member; and one of the voltage input contacts is electrically connected to the one side and the other of the voltage input contacts is electrically connected to the other side, so as to the induce current flow in the central member from the one side to the other side.

8. The apparatus according to claim 1, further comprising:

the static voltage means includes a Van de Graaff generator which provides the static voltage potential for applying across the pair of voltage input contacts and the central member;

the central member has two oppositely facing sides;

one of the voltage output contacts is electrically connected to one side and the other of the voltage output contacts is electrically connected to the other side, so as to receive the current flow from the central member; and one of the voltage input contacts is electrically connected to the one side and the other of the voltage input contacts is electrically connected to the other side, so as to induce the current flow in the central member from the one side to the other.

9. The apparatus according to claim 1, wherein:

the voltage input contacts are separately provided by two voltage input comb contacts; and the voltage output contacts are separately provided by two voltage output comb contacts, which are mounted in an interlacing alignment with respective ones of the two voltage input comb contacts.

10. An apparatus for supplying electric power, the apparatus comprising in combination:

a central member of an electret material having two oppositely facing sides;

a pair of voltage input contacts electrically connected to and spaced apart on the central member, wherein one of the voltage input contacts is mounted directly to one side and the other of the voltage input contacts is mounted directly to the other side of the central member;

static voltage means connected to the voltage input contacts for applying a static voltage potential across the voltage input contacts to create current flow in the central member; and a pair of voltage output contacts electrically connected to the central member, spaced apart from the voltage input contacts, wherein one of the voltage output contacts is mounted directly to one side and the other of the voltage output contacts is mounted directly to the other side of the central member for receiving the current flow while the static voltage potential is being applied to the central member.

11. The apparatus according to claim 10, wherein the central member consists essentially of the electret material.

12. The apparatus according to claim 10, wherein the static voltage means comprises a Van de Graaff generator.

13. The apparatus according to claim 10, wherein the voltage input contacts extend at least partially around respective ones of the voltage output contacts.

14. The apparatus according to claim 10, wherein:

the central member consists essentially of the electret material; and the voltage input contacts extend at least partially around respective ones of the voltage output contacts.

15. The apparatus according to claim 10, wherein:

the central member consists essentially of the electret material; and the voltage input contacts are separately provided by two voltage input comb contacts which are directly mounted to the opposite sides of the central member; and the voltage output contacts are separately provided by two voltage output comb contacts which are directly mounted to the opposite sides of the central member, in a spaced apart, interlacing alignment with respective ones of the voltage input contacts.

16. A method for supplying electrical power, the method comprising the steps of:

providing a central member formed from an electret material;

electrically connecting two spaced apart voltage input contacts to the central member;

electrically connecting two voltage output contacts to the central member, spaced apart one from the other and spaced apart from the voltage input contacts;

applying a static voltage potential to the voltage input contacts, causing a current flow in the central member; and while the static voltage potential is applied, connecting the voltage output contacts across an electrical load for passing the current flow from the central member.

17. The method according to claim 16, wherein the step of providing the central member formed of an electret material comprises:

forming the central member to consist essentially of the electret material.

18. The method according to claim 16, wherein the step of electrically connecting the voltage output contacts to the central member comprises separately connecting the voltage output contacts to oppositely facing sides of the central member.

19. The method according to claim 16, wherein:

the step of providing the central member comprises forming the central member to consist essentially of the electret material, having two oppositely facing sides;

the step of electrically connecting the voltage output contacts to the central member comprises separately connecting the voltage output contacts to the oppositely facing sides of the central member; and the step of electrically connecting the voltage input contacts to the central member comprises separately connecting the voltage input contacts to the oppositely facing sides of the central member.

20. The method according to claim 16, wherein:

the step of providing the central member comprises forming the central member to consist essentially of the electret material, having two oppositely facing sides;

the voltage input contacts are separately provided by two voltage input comb contacts which are directly mounted to respective opposite sides of the central member; and the voltage output contacts are separately provided by two voltage output comb contacts which are directly mounted to the respective opposite sides of the central member, in a spaced apart, interlacing alignment with respective ones of the voltage input contacts.

* * * * *